May 3, 1966 H. J. STRAUBE 3,249,912
ELECTROMECHANICAL TRANSDUCER
Filed Aug. 8, 1962
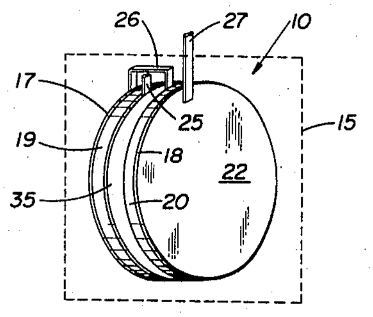
Fig. 1
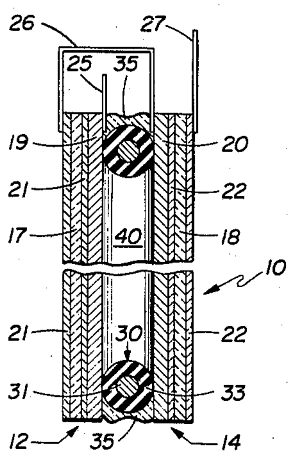
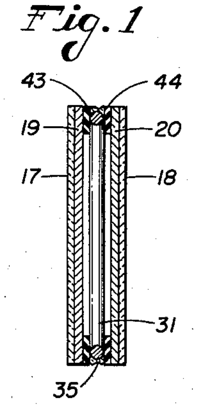
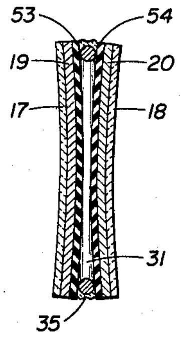
Fig. 2 Fig. 3 Fig. 4
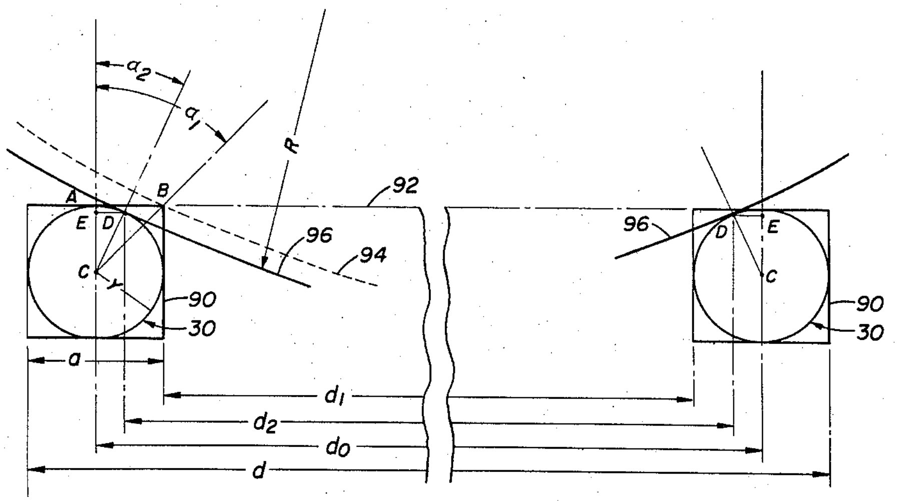
Fig. 5
INVENTOR.
HELMUT J. STRAUBE
BY Daniel D. Sharp
ATTORNEY United States Patent Office 3,249,912

Patented May 3, 1966

3,249,912

ELECTROMECHANICAL TRANSDUCER

Helmut J. Straube, Webster, N.Y., assignor to General Dynamics Corporation, Rochester, N.Y., a corporation of Delaware Filed Aug. 8, 1962, Ser. No. 215,585
10 Claims. (Cl. 340—10)

This invention relates to an electromechanical transducer and, more particularly, to an improved hydrophone for converting compressional wave energy to an electrical signal wherein increased sensitivity, for a given size, is attained.

Hydrophones of the bender type include a pair of spaced active components, in the form of juxtaposed ceramic discs or plates—normally backed by rigid supporting discs—mounted so as to undergo flexure when subjected to acoustic energy. This flexure gives rise to an electric voltage between electrodes of the opposed faces of each disc which is representative of the acoustic energy impinging upon the disc.

In prior art arrangements, as the discs undergo flexure, the region of support for the discs shifts inwardly as the discs slide along the supporting means. This results in a rather broad annular region adjacent the support which does not participate in the production of uniform stress distribution within the ceramic disc. In such prior art devices, the support for the disc normally has been provided outside the affected area of the active elements in order to avoid undesirable cancellation of electrical charges in the ceramic disc arising in the vicinity of the support means. This results either in reduced sensitivity of the transducer or in a larger size transducer, for a given sensitivity.

While it is true that a support introduced adjacent the center of the disc would not seriously affect the sensitivity because of the relatively small area of the disc rendered ineffective in such a support region, this type support would result in hydrostatic pressure being exterted on both sides of the discs and no stresses would be set up therein. A support adjacent the outside of the disc is necessary in order to establish a cavity between the discs for providing pressure release.

In accordance with the invention, the two active discs are spaced apart by a peripheral rigid member of substantially circular cross-section, with a mass of resilient material interposed between the rigid member and the discs. During inward flexure of the discs resulting from the hydrostatic and hydrodynamic pressures exerted on the faces of the discs exposed to the acoustic environment, the region of support for the discs will undergo a comparatively slight shift with radial expansion of the discs, since the discs will tend to roll over the arcuate resilient material placed between the support member and the discs. The support member provides a large degree of stiffness in a direction perpendicular to the faces of the discs so that the cavity formed by the transducer assembly will not collapse under hydrostatic pressure. At the same time, the annular mass of resilient material permits high compliance to be obtained in the direction parallel to the faces of the discs.

In the drawing:

FIG. 1 is a view showing external details of a typical transducer assembly according to the invention;

FIG. 2 is a cross-sectional view of the transducer of FIG. 1 as it normally appears in the absence of hydrostatic or hydrodynamic forces;

FIG. 3 is a cross-sectional view of a modification of the transducer of FIG. 1 and 2 wherein resilient pads are used instead of a tubular resilient enclosure for a spacer ring;

FIG. 4 is a cross-sectional view of a further modification of the transducer of FIGS. 1 and 2, as it appears when subjected to hydrostatic and hydrodynamic forces, and wherein a resilient spacer is disposed substantially coextensive with the transducer discs; and FIG. 5 is a diagram illustrating certain principles of operation of the invention and comparing this operation with that of a transducer having a support of square cross-section.

Referring to the drawing, a transducer assembly is indicated in FIGS. 1 and 2 by the reference numeral 10 and includes a pair of transducer elements 12 and 14 which, for reasons which will be evident later, is encapsulated or otherwise enclosed within an electrical insulating medium indicated by the dotted enclosure 15 in FIG. 1. Each transducer element 12 and 14 includes a pair of electroded, electrostrictive ceramic discs 17 and 18 backed by metal supporting discs 19 and 20, all respectively. The backing discs 19 and 20, which may be secured to the inner faces of respective ceramic discs 17 and 18 by an epoxy cement, provides support for the relatively fragile ceramic discs and limits the stresses set up within the ceramic material. The metal discs are facing each other, resulting in compressive stress being set up in the ceramic discs when subjected to hydrostatic pressure. This is desirable since ceramics are able to withstand much greater stress in compression than in tension. The ceramic discs 17 and 18 each are provided on the major surfaces with a thin electrically conductive layer or electrodes 21 and 22, respectively, secured to the inner and outer surface of the discs for providing suitable electrodes to which leads may be attached, as indicated in FIGS. 1 and 2. In the assembly 10 shown in FIGS. 1 and 2, two ceramic transducer elements 12 and 14 are connected in series, with one output lead 25 being secured to metal backing plate 19, a lead 26 being connected between the outermost electrode 21 and metal backing plate 20, and the other output lead 27 being secured to the outermost electrically conductive layer or electrode 22. The metal backing plate 19 and the innermost electrode 21 are in physical contact, as are the metal backing plate 20 and the innermost electrode 22. Although it is possible to derive an output voltage across one only of the transducer elements 12 or 14, a more sensitive device is obtained by means of the series connection. In some instances, the two transducer elements 12 and 14 may be connected in parallel. It should be noted, furthermore, that more than two transducer elements may be connected in series, or in parallel, as the case may be.

The two transducer elements 12 and 14 are spaced apart by a spacer 30 of substantially circular cross-section which is exposed adjacent the periphery of the ceramic discs. When the discs are of circular configuration, the spacer assumes the form of a solid ring 31, made, for example, of metal, covered wth a layer of elastic material 33, such as rubber. This resilient material 33 may be in the form of a sleeve covering the ring 31; or, the ring 31 may be coated with a rubber or other elastic material. The rubber covering or coating serves also to electrically insulate the two ceramic-metal disc assemblies or transducer elements 12 and 14. The rubber coated ring may be bonded to the periphery of each transducer element, as by rubber cement 35, to form a sealed cavity 40. In this way, this central cavity 40 is closed to the external environment so that no cancelling hydrodynamic pressures can be exerted on opposite sides of the same transducer. The sealing material 35 is not shown in FIGS. 1, 3, 4 and 5 for the sake of clarity. The spacer 30 provides limited compliance in a direction normal to the faces of the discs so that the central cavity 40 will not collapse under hydrostatic pressures. The rubber coated ring, however, provides comparatively unlimited compliance in a direction parallel to the discs, so that the discs are free to expand radially with flexure arising from applied hydrostatic and hydrodynamic pressures. As the transducer is subjected to hydrostatic pressure incident to underwater submergence, the transducers flex inwardly, as indicated in FIG. 4. The resultant radial expansion of the transducer discs 17 and 18 not only cause compression of the resilient material 33, but also cause a shift in the region of support between the discs and the spacer 30. Because of the circular configuration of the rubber-coated ring, however, the amount of shift of the support line from the quiescent position of FIG. 1 to the flexed position of FIG. 2 is relatively small compared with that of prior art devices. The curved cross-section of the spacer 30 provides a more or less rolling action of the discs relative to the resilient mass 33 surrounding the ring 31, rather than a sliding contact, as in prior art devices.

This phenomena is best explained with reference to FIG. 5 wherein a conventional rectangular support, indicated by reference numeral 90, and a circular support 30, or spacer, in accordance with the invention are shown enlarged for the sake of clarity. The dashed line 92 indicates the inner peripheral position of the transducer element when subjected to zero hydrostatic pressure for both rectangular and circular support.

For a flat support of square configuration of width $a$, the center of support will shift a distance $a/2$ from point A to point B. The magnitude of the bending radius is of no consequence. The position of the transducer element, in the case of the square support, when subjected to hydrostatic stress, is shown approximately by the curved line 94. The angular shift $\alpha_1$ of the center of support for the square support remains substantially constant regardless of the bending radius of the transducer element caused by the hydrostatic pressure.

If the diameter $d$ of the transducer disc is assumed to be ten times the width $a$ of support 90 (a practical ratio of diameter to width of support), the effective diametre $d_0$ of the unstressed disc, for the case of the square support, will be $9a$. The effective diameter $d_1$ for the transducer disc subjected to hydrostatic stress will be equal to $8a$. The effective area of the transducer assembly will then be $$\frac{\pi(8a)^2}{4}$$

or $50.2a^2$.

The transducer element in the case of a support 30 of circular cross-section will be supported tangentially at point D and the position of the transducer disc is then approximately as shown by the solid curve 96. For small deflections, that is, for a large bending radius R, the radius $r$ at the tangential point forms an angle with the line AC drawn through the center C and point A which is smaller than $\alpha_1$. The angle $\alpha_2$ has been shown in FIG. 5 considerably exaggerated in order to clarify the drawing. In practice, the angle $\alpha_2$ assumes a maximum value of the order of 10° and a normal value of the order of 5°. The amount of shift DE of the center of support in the case of the circular support may be shown by simple trigonometric analysis to be given by $$DE=\gamma \sin \alpha_2=\frac{a}{2} \sin \alpha_2$$

The effective diameter $d_0$ of support for the circular case, when subjected to zero hydrostatic stress, is equal to the distance between centers of the diametrically opposed portions of the support ring 30 and is obviously equal to $9a$. The effective diameter $d_2$ of the transducer, for the case of a hydrostatically stressed disc with circular support, is lessened by twice the distance DE. Consequently, the effective diameter $d_2$ of the transducer disc, for the case of a circular support, is equal to $$9a-2\left(\frac{a}{2}\right) \sin \alpha_2$$

For an angle of 5°, the effective diameter then becomes $9a-.0872a=8.9128a$. The effective area then is $$\frac{\pi(8.956a)^2}{4}=62.8a^2$$

which represents a 23.3% increase in effective area of the transducer disc.

It is obvious that the effective area is restricted to even a greater extent with a ring of rectangular cross-section which is other than the square cross-section shown in FIG. 5.

Instead of using a mass of resilient material of tubular configuration, as in FIGS. 1–3, a pair of resilient pads 43 and 44 may be disposed about the periphery of the discs 17 and 18 between the ring 31 and the disc, as shown in FIG. 3. In illustrating FIGS. 3 and 4, the electrodes have been omitted for the sake of clarity. Alternatively, continuous sheets 53 and 55 of resilient material, the area of which is substantially equal to that of the discs, may be inserted between the ring 31 and the disc assemblies 12 and 14, as shown in FIG. 4. In the devices of FIGS. 3 and 4, the resilient material tends to form around the arcuate configuration of the supporting member 30 in the same manner as in the case of the device of FIGS. 1 and 2.

While there has been shown and described a specific embodiment of the invention, other modifications will readily occur to those skilled in the art. It is not, therefore, desired that this invention be limited to the specific arrangement shown and described and it is intended in the appended claims to cover all modifications within the spirit and scope of the invention.

What is claimed is:

1. A transducer comprising at least one pair of plates exhibiting electromechanical transducing action, spacer means for mounting said pair of plates in spaced relationship, said spacer means including a rigid member disposed adjacent the periphery of said plates and having a rigid portion of substantially circular cross-section, one face of each of said plates being positioned in cooperative relationship with said member so that said one face of each of said plates rock relative to said circular cross section of said rigid portion, said spacer means providing limited compliance in a direction substantially normal to said one face of each of said plates and comparatively unlimited compliance in a direction substantially parallel to said one face of each of said plates.

2. A transducer comprising at least one pair of plates exhibiting electromechanical transducing action, spacer means for mounting said pair of plates in spaced relationship, said spacer means including a rigid member disposed adjacent the periphery of said plates and having a rigid portion of substantially circular cross-section, one face of each of said plates being positioned in cooperative relationship with said member so that said one face of each of said plates rock relative to said circular cross section of said rigid portion, said spacer means providing limited compliance in a direction substantially normal to said one face of each of said plates and comparatively unlimited compliance in a direction substantially parallel to said one face of said plates, said plates and said spacer means bounding a cavity sealed against any external environment.

3. A transducer comprising at least one pair of plates exhibiting electromechanical transducing action, spacer means for mounting said pair of plates in spaced relationship, said spacer means including a rigid member disposed adjacent the periphery of said plates and having a rigid portion of substantially circular cross-section, one face of each of said plates being positioned in cooperative relationship with said member so that said one face of each of said plates rock relative to said circular cross section of said rigid portion, said spacer means further including a pair of plates of resilient material disposed substantially coextensive with said transducing plates and having a peripheral portion interposed between said member and said plates, said spacer means providing limited compliance in a direction substantially normal to said one face of said plates and comparatively unlimited compliance in a direction substantially to said one face of each of said plates.

4. A transducer comprising at least one pair of plates exhibiting electromechanical transducing action, spacer means for mounting said pair of plates in spaced relationship, said spacer means including a rigid member disposed adjacent the periphery of said plates, said member having a inner rigid portion of substantially circular cross-section, and an outer resilient portion contiguous to said pair of plates, said spacer means providing limited compliance in a direction substantially normal to the faces of the plates and comparatively unlimited compliance in a direction substantially parallel to the faces of said plates, said plates and said spacer means bounding a cavity sealed against any externl environment.

5. A transducer comprising at least one pair of discs exhibiting electromechanical transducing properties, a rigid member of circular cross-section positioned between said discs and mounted adjacent the periphery of said discs, said periphery of said disc being rockable about said rigid member of circular cross section, said member being at least partially coated with a resilient material, said discs and said member forming boundaries of a cylindrical cavity sealed against an external environment.

6. A transducer comprising at least one pair of discs exhibiting electromechanical transducing properties, a solid ring of arcuate cross-section coated with a resilient material, said coated ring being disposed between said discs along the periphery of said discs, said periphery of said disc being rockable on said arcuate cross-section of said solid ring and means for resiliently bonding said coated ring to said discs to form a hermetically sealed unit.

7. A transducer comprising at least one pair of discs which exhibit electromechanical transducing properties, a solid ring of arcuate cross-section, said ring being disposed between said discs along the periphery of said discs, and means for resiliently bonding said ring to said discs to form a hermetically sealed unit, said solid ring permitting rolling friction between said disc and said solid ring rather than sliding friction when said discs are acted upon by hydrostatic or hydrodynamic forces.

8. A transducer comprising at least one pair of prepolarized ferroelectric ceramic discs mounted on resilient mounting plates, electrode means secured to opposite faces of said discs, a rigid ring of substantially circular cross-section having a diameter substantially equal to the diameter of said mounting plates, a mass of resilient material at least a portion of which is bonded to said ring, and means for bonding said resilient mass to said discs along the periphery of said discs, whereby a hermetically sealed cylindrical cavity is formed between said discs.

9. The transducer as defined in claim 1 wherein said spacer means further includes pads of resilient material interposed between said member and said plates.

10. The transducer as defined in claim 2 wherein said spacer means further includes a mass of resilient material interposed between said member and said plates.

References Cited by the Examiner

UNITED STATES PATENTS

| | | | |
|---|---|---|---|
| 1,174,996 | 3/1916 | Kulp | 340—14 |
| 1,276,156 | 8/1918 | Allen | 340—14 |
| 2,702,692 | 2/1955 | Kessler | 340—10 |
| 3,056,589 | 10/1962 | Daniel | 340—10 |

CHESTER L. JUSTUS, *Primary Examiner.*

LEWIS H. MYERS, *Examiner.*

J. W. MILLS, G. M. FISHER, *Assistant Examiners.*